(12) United States Patent
Yamamoto et al.

(10) Patent No.: US 9,975,202 B2
(45) Date of Patent: May 22, 2018

(54) METHOD OF PRODUCING SIC WAFER

(71) Applicant: DISCO CORPORATION, Tokyo (JP)

(72) Inventors: Ryohei Yamamoto, Tokyo (JP); Kazuya Hirata, Tokyo (JP)

(73) Assignee: Disco Corporation, Tokyo (JP)

(*) Notice: Subject to any disclaimer, the term of this patent is extended or adjusted under 35 U.S.C. 154(b) by 0 days. days.

(21) Appl. No.: 15/678,785

(22) Filed: Aug. 16, 2017

(65) Prior Publication Data

US 2018/0056440 A1 Mar. 1, 2018

(30) Foreign Application Priority Data

Aug. 29, 2016 (JP) .................................. 2016-166476

(51) Int. Cl.
*B23K 26/08* (2014.01)
*B28D 5/00* (2006.01)
*H01L 21/02* (2006.01)
*H01L 31/00* (2006.01)
*B23K 26/00* (2014.01)
*B23K 26/53* (2014.01)
*B23K 103/00* (2006.01)

(52) U.S. Cl.
CPC ...... *B23K 26/0057* (2013.01); *B23K 26/0006* (2013.01); *B23K 26/0853* (2013.01); *B23K 26/53* (2015.10); *B28D 5/0011* (2013.01); *B23K 2203/56* (2015.10)

(58) Field of Classification Search
CPC ........... B23K 26/0057; B23K 26/0622; B23K 26/53; B23K 26/0006; B23K 2203/56; B28D 5/0011
See application file for complete search history.

(56) References Cited

U.S. PATENT DOCUMENTS 9,868,177 B2 *  1/2018  Hirata ................ B23K 26/0057
9,878,397 B2 *  1/2018  Hirata ................ B23K 26/0057
9,884,389 B2 *  2/2018  Hirata ................ B23K 26/0057

FOREIGN PATENT DOCUMENTS

JP  2000-094221  4/2000
JP  2013-049161  3/2013

* cited by examiner

*Primary Examiner* — Seahvosh Nikmanesh
(74) *Attorney, Agent, or Firm* — Greer Burns & Crain, Ltd

(57) ABSTRACT

An SiC wafer is generated from an SiC ingot by a peel-off plane generating step for generating a peel-off plane by forming a separation layer made up of a modified layer, and cracks extending from the modified layer along a c-plane, a plurality of times by indexing-feeding a focused point of a pulsed laser beam and the SiC ingot relative to each other in a direction in which an off-angle is formed, thereby forming a plurality of separation layers to generate the peel-off plane. The peel-off plane generating step includes relatively moving the focused point from an end to an opposite end of the SiC ingot in a forward stroke and relatively moving the focused point from the opposite end to the end of the SiC ingot in a backward stroke to trace back the separation layer that has already been formed in the forward stroke.

1 Claim, 6 Drawing Sheets

METHOD OF PRODUCING SIC WAFER

BACKGROUND OF THE INVENTION

Field of the Invention

The present invention relates to a method of producing an SiC wafer from a single-crystal SiC ingot. Description of the Related Art Devices such as integrated circuits (ICs), large-scale integration (LSI) circuits, light emitting diodes (LEDs), etc. are fabricated by depositing a functional layer on the surface of a wafer made of Si (silicon), $AL_2O_3$ (sapphire), or the like and demarcating the wafer with projected dicing lines. Power devices, LEDs, etc. are fabricated by depositing a functional layer on the surface of a wafer made of single-crystal SiC (silicon carbide) and demarcating the wafer with projected dicing lines. A wafer with devices formed thereon is processed and diced along projected dicing lines thereon into individual device chips by a cutting apparatus or a laser processing apparatus. The divided individual device chips will be used on electric appliances such as mobile phones, personal computers, etc.

Wafers on which devices are to be formed are generally produced from a cylindrical ingot by slicing it with a wire saw. A wafer sliced from such an ingot has its face and reverse sides polished to a mirror finish (see Japanese Patent Laid-Open No. 2000-94221). Slicing an ingot into a wafer with a wire saw and polishing the face and reverse sides of the wafer is uneconomical because most (70% through 80%) of the ingot is wasted. In particular, single-crystal SiC ingots are so hard that they are difficult to cut with a wire saw and take a considerable period of time to cut, resulting in poor productivity. Single-crystal SiC ingots are also problematic in that they are expensive and are not conducive to efficient generation of wafers.

There has been proposed a technology wherein a laser beam having a wavelength with which SiC is transmittable is applied to an SiC ingot such that the laser beam has a focused spot within the SiC ingot, forming a modified layer at a planned cutting plane in the SiC ingot, and the SiC ingot is then cut along the planned cutting plane where the modified layer is formed, thereby producing an SiC wafer (see Japanese Patent Laid-Open No. 2013-49161). However, the productivity of the proposed technology is low because modified layers have to be formed closely at intervals of approximately 10 μm in an SiC ingot in order to produce SiC wafers from the SiC ingot.

SUMMARY OF THE INVENTION

It is an object of the present invention is to provide a method of producing an SiC wafer from a single-crystal SiC ingot such that the SiC wafer can easily be peeled off from the single-crystal SiC ingot and productivity can be increased.

In accordance with an aspect of the present invention, there is provided a method of producing an SiC wafer from a single-crystal SiC ingot having a first surface, a second surface opposite the first surface, a c-axis extending from the first surface to the second surface and oblique to a line perpendicular to the first surface, and a c-plane perpendicular to the c-axis, the c-plane and the first surface jointly defining an off-angle therebetween, including a peel-off plane forming step of forming a peel-off plane in the SiC ingot by performing a separation layer forming step by positioning a focused point of a pulsed laser beam having a wavelength with which SiC is transmittable in the SiC ingot at a depth, from the first surface, corresponding to the thickness of a wafer to be produced from the SiC ingot, and applying a pulsed laser beam to the SiC ingot while the SiC ingot and the focused point are relatively processing-fed in a first direction perpendicular to a second direction in which the off-angle is formed, thereby forming a separation layer made up of a modified layer where SiC is separated into Si and C by a pulsed laser beam applied thereto and a pulsed laser beam applied next thereto is absorbed by the previously formed C, separating SiC into Si and C in a chain reaction, and cracks extending from the modified layer along the c-plane, the separation layer forming step being performed a plurality of times by indexing-feeding the SiC ingot and the focused point relatively to each other in the second direction in which the off-angle is formed, thereby forming a plurality of separation layers to form the peel-off plane, and a wafer producing step of peeling off a portion of the SiC ingot from the peel-off plane that serves as a boundary plane, as an SiC wafer, wherein the peel-off plane forming step includes relatively moving the focused point from an end to an opposite end of the SiC ingot in a forward stroke and relatively moving the focused point from the opposite end to the end of the SiC ingot in a backward stroke to trace back the separation layer that has already been formed in the forward stroke.

With the method of producing an SiC wafer according to the present invention, a linear modified layer is formed on the c-plane and a separation layer is formed on both sides of the modified layer by cracks propagating along the c-plane in the separation layer forming process. When the separation layer forming step is performed a plurality of times by indexing-feeding the SiC ingot and the focused point relatively to each other in the direction in which the off-angle is formed, separation layers that are adjacent to each other in the direction in which the off-angle is formed are joined to each other by the cracks, forming a peel-off plane. When a portion of the SiC ingot is peeled off from the peel-off plane that serves as a boundary plane, an SiC wafer having a desired thickness is easily produced from the SiC ingot. Therefore, the wafer is efficiently produced from the SiC ingot with a sufficient increase in productivity, and the amount of ingot material that is wasted is sufficiently reduced to approximately 30%.

In the forward stroke, a modified layer that is produced initially is formed at the focused point of the laser beam, and a modified layer that is produced subsequently to the initial modified layer is formed at positions progressively shallower than the focused point.

Specifically, in a region extending over a distance of approximately several tens of pm from one end of the SiC ingot where the laser beam starts to be applied to the SiC ingot, the modified layer rises. When the modified layer reaches a depth in the SiC ingot where the power density of the laser beam is of a predetermined value, the modified layer stops rising and is formed stably at the depth in the SiC ingot where the power density of the pulsed laser beam is of the predetermined value. During the forward stroke, therefore, in a region in the SiC ingot other than the region where the modified layer rises in the SiC ingot from the end to the opposite end of the SiC ingot where the pulsed laser beam is applied, the modified layer is formed stably at the position where the power density of the laser beam is of the predetermined value, located short of the focused point of the laser beam.

The region where the modified layer has risen can present an obstacle to the peeling off of a portion of the SiC ingot from the peel-off plane that serves as a boundary plane. With the method of producing an SiC wafer according to the present invention, however, in the peel-off plane forming step, the SiC ingot and the focused point are relatively moved in the forward stroke during which the focused point is relatively moved from the end to the opposite end of the SiC ingot and in the backward stroke during which the focused point is relatively moved from the opposite end to the end of the SiC ingot, tracing back the separation layer that has already been formed in the forward stroke. In the forward stroke, the modified layer rises in the region extending over the distance of approximately several tens of pm from the end of the'ingot where the laser beam starts to be applied to the SiC ingot. In the backward stroke, however, inasmuch as the modified layer has already been formed at the depth where the power density of the laser beam is of the predetermined value, a modified layer is formed stably, without rising, from the opposite end to the end of the SiC ingot at the position where the power density of the laser beam is of the predetermined value, located short of the focused point of the pulsed laser beam. With the method of producing an SiC wafer according to the present invention, consequently, the region where the modified layer has risen does not present an obstacle to the peeling off of a portion of the SiC ingot from the peel-off plane that serves as a boundary plane, so that a portion of the SiC ingot can easily be peeled off from the peel-off plane that serves as a boundary plane.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
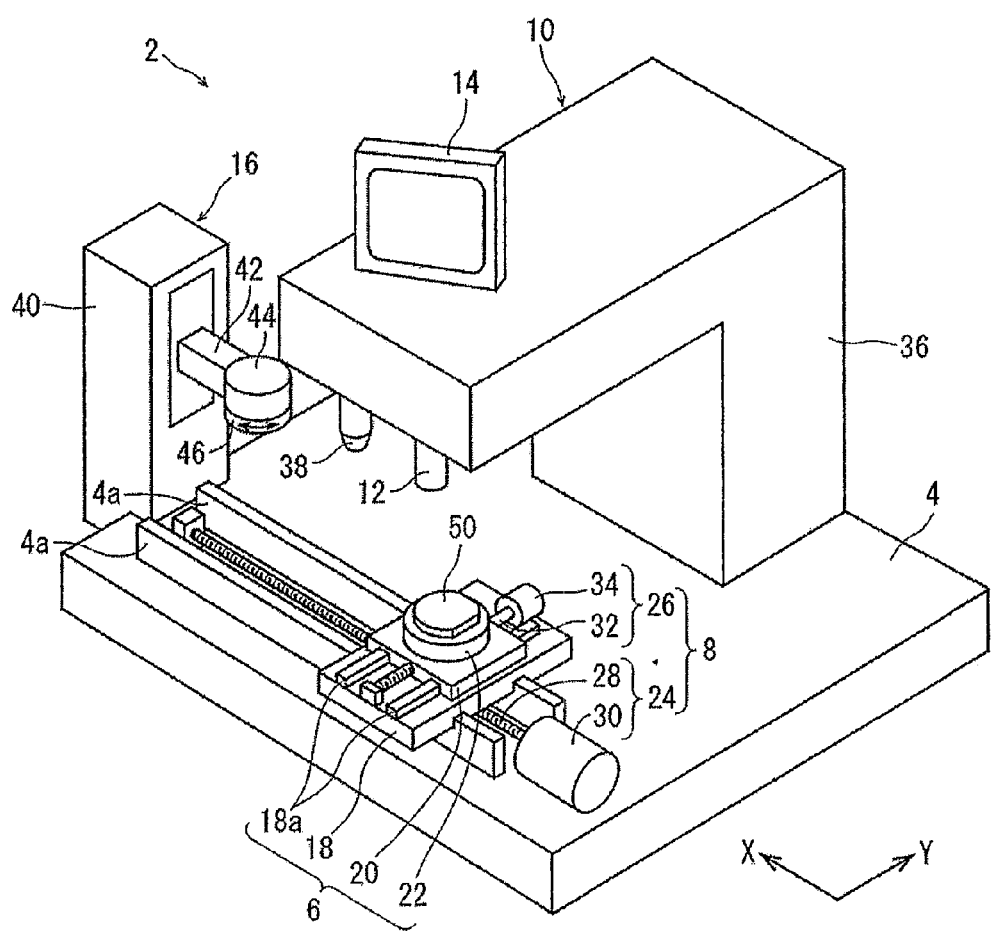
FIG. 1 is a perspective view of a laser processing apparatus.

A method of generating an SiC wafer according to a preferred embodiment of the present invention will be described below with reference to the drawings. As illustrated in FIG. 1, a laser processing apparatus 2 on which to carry out the method of generating an SiC wafer according to the present invention includes a base table 4, holding means 6 for holding a workpiece, moving means 8 for moving the holding means 6, laser beam applying means 10, imaging means 12, display means 14, and peeling means 16.

The holding means 6 includes a rectangular X-direction movable plate 18 mounted on the base table 4 for movement in X directions, a rectangular Y-direction movable plate 20 mounted on the X-direction movable plate 18 for movement in Y directions, and a cylindrical chuck table 22 rotatably mounted on an upper surface of the Y-direction movable plate 20. The X directions refer to directions indicated by the arrow X in FIG. 1, and the Y directions refer to directions indicated by the arrow Y in FIG. 1 and are perpendicular to the X directions. The X and Y directions jointly define a plane which is essentially a horizontal plane.

The moving means 8 includes X-direction moving means 24, Y-direction moving means 26, and rotating means, not illustrated. The X-direction moving means 24 has a ball screw 28 extending in the X directions over the base table 4 and a motor 30 coupled to an end of the ball screw 28. The ball screw 28 is threaded through a nut, not illustrated, fixed to a lower surface of the X-direction movable plate 18. When the motor 30 is energized, the ball screw 28 converts rotary motion of the motor 30 into linear motion and transmits the linear motion to the X-direction movable plate 18, moving the X-direction movable plate 18 selectively in one or the other of the X directions along a pair of guide rails 4a on the base table 4. The Y-direction moving means 26 has a ball screw 32 extending in the Y directions over the X-direction movable plate 18 and a motor 34 coupled to an end of the ball screw 32. The ball screw 32 is threaded through a nut, not illustrated, fixed to a lower surface of the Y-direction movable plate 20. When the motor 34 is energized, the ball screw 32 converts rotary motion of the motor 34 into linear motion and transmits the linear motion to the Y-direction movable plate 20, moving the Y-direction movable plate 20 selectively in one or the other of the Y directions along a pair of guide rails 18a on the X-direction movable plate 18. The rotating means has a motor, not illustrated, housed in the chuck table 22. When energized, the motor rotates the chuck table 22 about its own axis with respect to the Y-direction movable plate 20.

The laser beam applying means 10 includes a frame 36 mounted on an upper surface of the base table 4 and having an overhanging arm extending substantially horizontally, pulsed laser beam oscillating means, not illustrated, housed in the frame 36, a beam condenser 38 disposed on a lower surface of the distal end of the overhanging arm of the frame 36, and focused point position adjusting means, not illustrated. The pulsed laser beam oscillating means has an oscillator for oscillating a pulsed laser beam LB (see FIGS. 5A and 5B), a setting unit for setting a repetitive frequency of the pulsed laser beam LB oscillated by the oscillator, and an adjuster for adjusting the output power of the pulsed laser beam LB. These components of the pulsed laser beam oscillating means are omitted from illustration. The beam condenser 38 has a condensing lens, not illustrated, for converging the pulsed laser beam LB emitted from the pulsed laser beam oscillating means. The imaging means 12 is mounted on the lower surface of the distal end of the overhanging arm of the frame 36 and spaced from the beam condenser 38 in the Y directions. The display means 14, which displays images captured by the imaging means 12, is mounted on an upper surface of the distal end of the overhanging arm of the frame 36.

The peeling means 16 includes a casing 40 mounted on the base table 4 and extending upwardly from ends of the guide rails 4a and an arm 42 extending along the X directions from the casing 40. The arm 42 has a proximal end supported on the casing 40 and movable vertically. The casing 40 houses therein vertically moving means, not illustrated, for moving the arm 42 vertically. A motor 44 is mounted on the distal end of the arm 42. A disk-shaped suction member 46 is coupled to a lower surface of the motor 44 for rotation about a vertical axis. The suction member 46 has a plurality of suction holes, not illustrated, defined in a lower surface thereof and connected to suction means, not illustrated, by fluid passageways, not illustrated. The suction member 46 houses therein ultrasonic vibration applying means, not illustrated, for applying ultrasonic vibrations to the lower surface of the suction member 46.

Figure 2A:
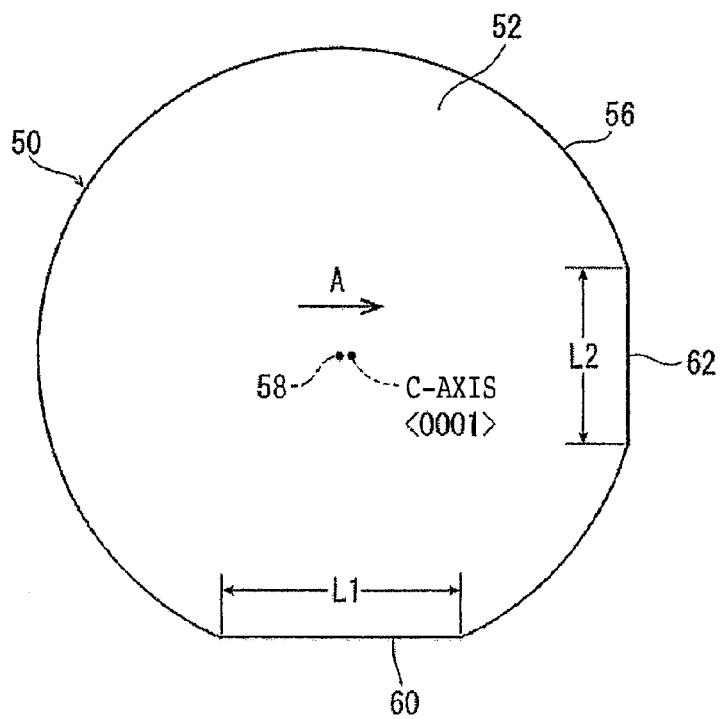
FIG. 2A is a plan view of a single-crystal SiC ingot.
Figure 2B:
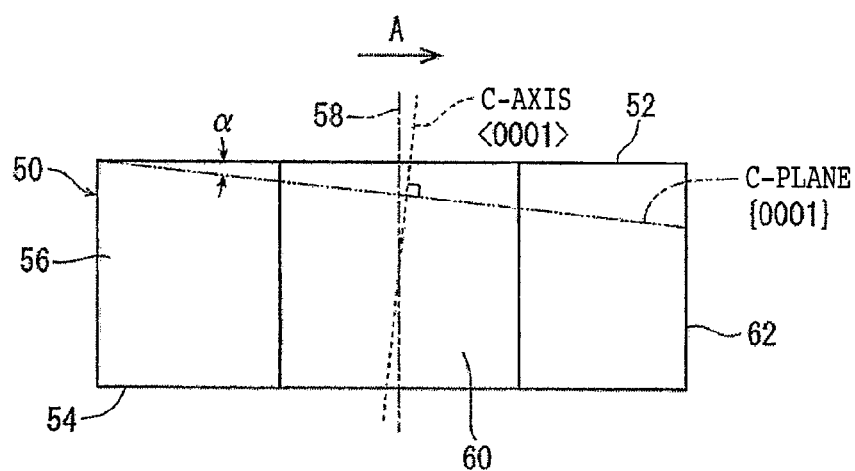
FIG. 2B is a front elevational view of the single-crystal SiC ingot.

FIGS. 2A and 2B illustrate a hexagonal single-crystal SiC ingot 50 (hereinafter referred to as "ingot 50") which is of a cylindrical shape as a whole. The ingot 50 has a circular first surface 52, a circular second surface 54 opposite the first surface 52, a cylindrical peripheral surface 56 positioned between the first surface 52 and the second surface 54, a c-axis (<0001>direction) extending from the first surface 52 to the second surface 54, and a c-plane ({0001} plane) perpendicular to the c-axis. The c-axis is oblique to a line 58 perpendicular to the first surface 52. The ingot 50 has an off-angle α (for example, α=4 degrees) formed between the c-plane and the first surface 52. The off-angle α is formed in the direction indicated in FIGS. 2A and 2B by the arrow A. The peripheral surface 56 includes a rectangular first orientation flat 60 and a rectangular second orientation flat 62 which indicate crystal orientations. The first orientation flat 60 lies parallel to the direction A in which the off-angle α is formed, and the second orientation flat 62 lies perpendicularly to the direction A in which the off-angle α is formed. As illustrated in FIG. 2A, as viewed in the direction of the perpendicular line 58, the length L2 of the second orientation flat 62 is smaller than the length L1 of the first orientation flat 60 (L2<L1).

Now, the method of producing an SiC wafer, which uses the laser processing apparatus 2, will be described below. First, as illustrated in FIG. 1, the ingot 50 is secured to the chuck table 22 with an adhesive, e.g., an epoxy-resin adhesive, interposed between the second surface 54 of the ingot 50 and the upper surface of the chuck table 22. The ingot 50 may be held on the upper surface of the chuck table 22 under suction forces developed through a plurality of suction holes, not illustrated, defined in an upper surface of the chuck table 22. Then, the chuck table 22 is moved to a position below the imaging means 12 by the moving means 8, after which the imaging means 12 captures an image of the ingot 50.

Figure 3:
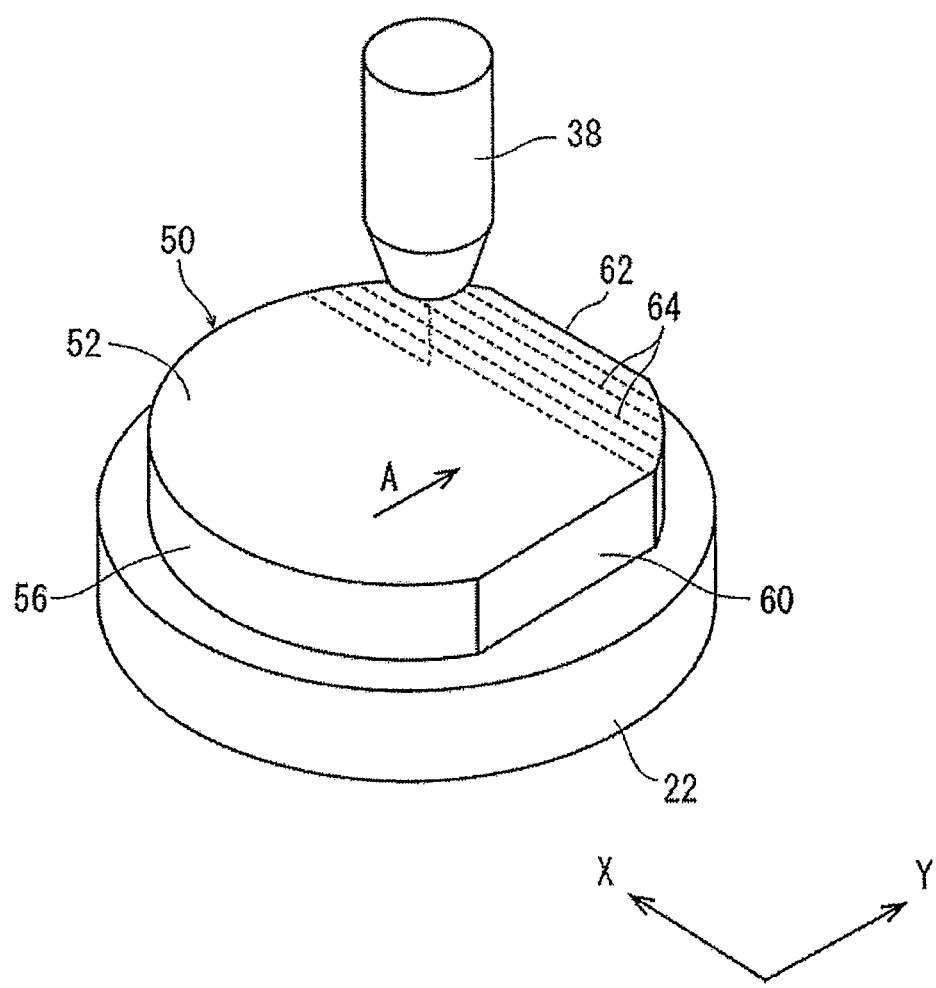
FIG. 3 is a perspective view illustrating the manner in which a peel-off plane forming step is carried out on the single-crystal SiC ingot.
Figure 4A:
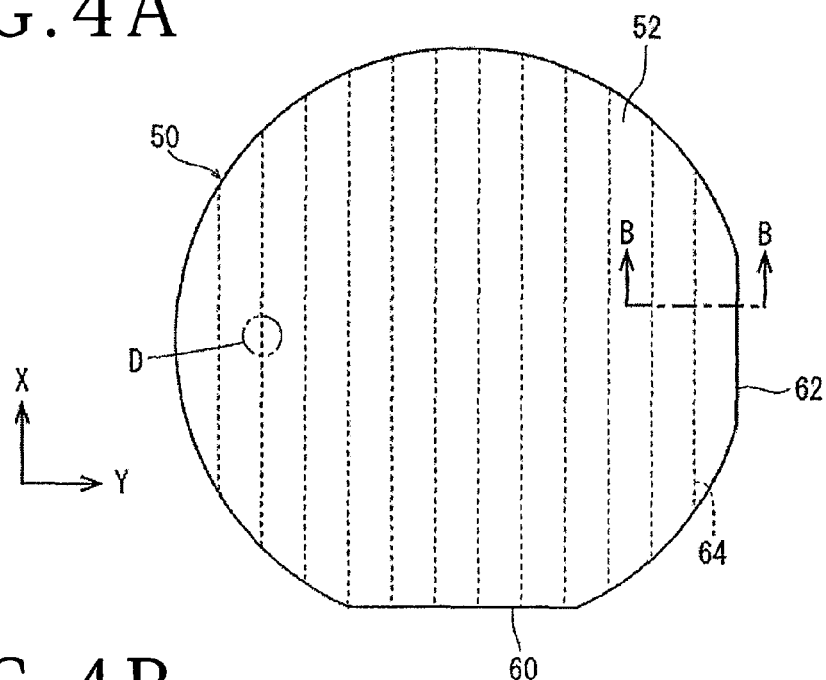
FIG. 4A is a plan view of the single-crystal SiC ingot in which peel-off planes have been formed.
Figure 4B:
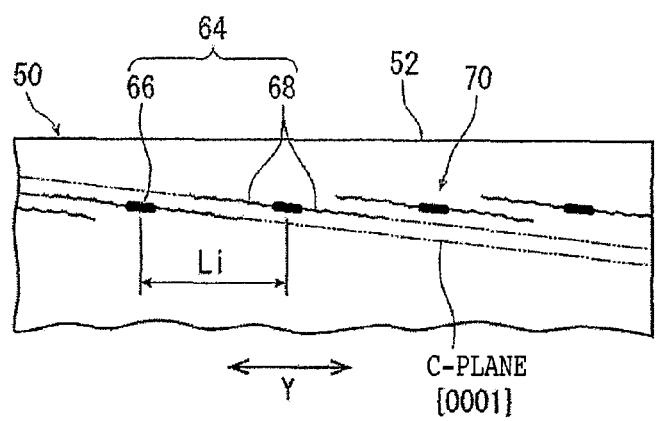
FIG. 4B is a cross-sectional view taken along line B-B of FIG. 4A.
Figure 4C:
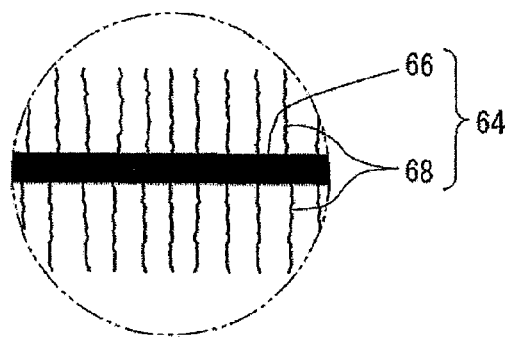
FIG. 4C is an enlarged plan view of a region D of the single-crystal SiC ingot illustrated in FIG. 4A.
Figure 5A:
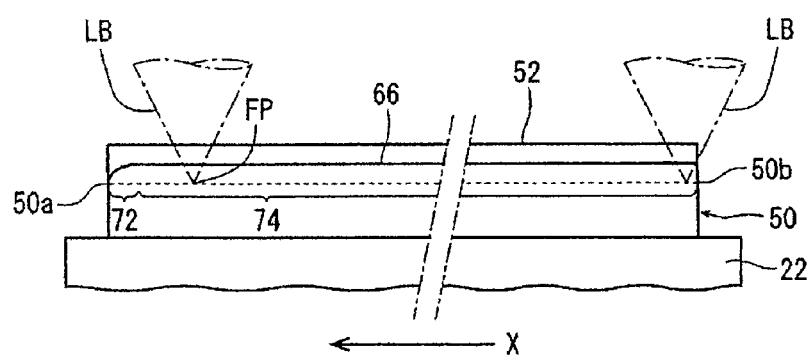
FIG. 5A is a side elevational view illustrating the manner in which the focused point of a laser beam is traveling in a forward stroke.
Figure 5B:
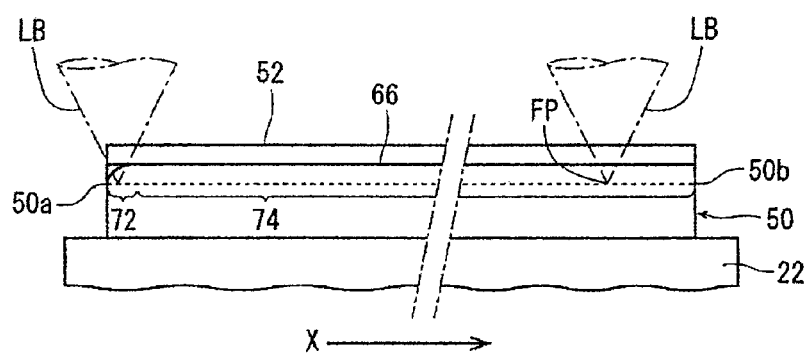
FIG. 5B is a side elevational view illustrating the manner in which the focused point of the laser beam is traveling in a backward stroke.

Then, a peel-off plane forming step is carried out. In the peel-off plane forming step, based on the image of the ingot 50 captured by the imaging means 12, the moving means 8 moves and rotates the chuck table 22 to adjust the orientation of the ingot 50 to a prescribed orientation, and to adjust the positions of the ingot 50 and the beam condenser 38 in an XY plane. When adjusting the orientation of the ingot 50 to the prescribed orientation, as illustrated in FIG. 3, the first orientation flat 60 is aligned with the Y direction and the second orientation flat 62 is aligned with the X direction, thereby aligning the direction A in which the off-angle α is formed with the Y direction and aligning the direction perpendicular to the direction A in which the off-angle α is formed with the X direction. Then, the focused point position adjusting means vertically moves the beam condenser 38 to position the focused point FP of the pulsed laser beam LB at a position in the ingot 50 which is spaced from the first surface 52 by a depth or distance corresponding to the thickness of a wafer to be produced from the ingot 50, as illustrated in FIGS. 5A and 5B. Then, a separation layer forming step is carried out. In the separation layer forming step, while the ingot 50 and the focused point FP, i.e., the beam condenser 38, are relatively processing-fed in the X direction aligned with the direction perpendicular to the direction A in which the off-angle α is formed, the beam condenser 38 applies the pulsed laser beam LB having a wavelength with which SiC is permeable to the ingot 50 to form a separation layer in the ingot 50. When the separation layer forming step is carried out, as illustrated in FIGS. 4A, 4B and 4C, there are formed in the ingot 50 a separation layer 64 made up of a modified layer 66 where SiC is separated into Si (silicon) and C (carbon) by a pulsed laser beam LB applied thereto and a pulsed laser beam LB applied next thereto is absorbed by the previously formed C, separating SiC into Si and C in a chain reaction and cracks 68 extending from the modified layer 66 to both sides thereof along the c-plane. In the separation layer forming process, the pulsed laser beam LB is applied to the ingot 50 while the chuck table 22 is processing-fed in the X direction so as to have adjacent spots overlap each other at the depth where the modified layer 66 is formed, so that the pulsed laser beam LB is applied again to the modified layer 66 where SiC has been separated into Si and C. In order for adjacent spots to overlap each other, it is necessary to satisfy $G=(V/F)-D<0$ where V represents the processing-feed speed (mm/second) of the chuck table 22, F the repetitive frequency (Hz) of the pulsed laser beam LB, and D the diameter (mm) of the spots. The overlapping ratio of adjacent spots is represented by $|G|/D$.

In the peel-off plane forming step, the chuck table 22 is indexing-fed a predetermined indexing distance Li in the Y direction, i.e., the direction A in which the off-angle α is formed, with respect to the focused point FP by the Y-direction moving means 26. In this manner, a plurality of separation layer forming steps are carried out to form a plurality of separation layers 64 to generate a peel-off plane 70 in the ingot 50, as illustrated in FIGS. 4A, 4B, and 4C. In the peel-off plane 70, separation layers 64 that are adjacent to each other in the direction A in which the off-angle α is formed are joined to each other by cracks 68.

With the method of producing an SiC wafer according to the present invention, in the separation layer forming step in the peel-off plane forming step, it is important to note that the ingot 50 and the focused point FP are relatively processing-fed in a forward stroke (see FIG. 5A) and a backward stroke (see FIG. 5B). In the forward stroke, as illustrated in FIG. 5A, the focused point FP is relatively moved from an end 50a to a diametrically opposite end 50b of the ingot 50. In the backward stroke, as illustrated in FIG. 5B, the focused point FP is relatively moved from the diametrically opposite end 50b to the end 50a of the ingot 50.

According to the present embodiment, as illustrated in FIG. 5A, the chuck table 22 is moved with respect to the focused point FP at a predetermined processing-feed speed in the forward stroke from the right to the left in FIG. 5A by the X-direction moving means 24. In the forward stroke, a modified layer 66 that is produced initially is formed at the focused point FP of the pulsed laser beam LB, and a modified layer 66 that is produced subsequently to the initial modified layer 66 is formed at positions progressively shallower than the focused point FP. Specifically, in a region 72 extending over a distance of approximately several tens of μm from the end 50a of the ingot 50 where the pulsed laser beam LB starts to be applied to the ingot 50, the modified layer 66 rises a distance ranging from approximately 30 to 50 μm from the depth of the focused point FP. The path traced by the focused point FP in the ingot 50 is indicated by the dotted line in FIGS. 5A and 5B. When the modified layer 66 reaches a depth in the ingot 50 where the power density E (described later) of the pulsed laser beam LB is of a predetermined value, the modified layer 66 stops rising and is formed stably at the depth in the ingot 50 where the power density E of the pulsed laser beam LB is of the predetermined value. During the forward stroke, therefore, in a region 74 in the ingot 50 other than the region 72 where the modified layer 66 rises in the ingot 50 from the end 50a to the end 50b of the ingot 50 where the pulsed laser beam LB is applied, the modified layer 66 is formed stably at the position where the power density E of the pulsed laser beam LB is of the predetermined value, located short of the focused point FP of the pulsed laser beam LB, i.e., closer to the first surface 52 of the ingot 50. The power density E (J/cm$^2$) is indicated by E=P/(S·F) where P represents the average output power (W) of the pulsed laser beam LB, S (=ΠD$^2$/4) the area (cm$^2$) of a spot at the position shallower than the focused point FP and in which the modified layer 66 is formed, and F the repetitive frequency (Hz) of the pulsed laser beam LB.

According to the present embodiment, as illustrated in FIG. 5B, after the chuck table 22 has been moved with respect to the focused point FP in the forward stroke, the chuck table 22 is not indexing-fed, but is moved with respect to the focused point FP at a predetermined processing-feed speed in the backward stroke from the left to the right in FIG. 5B by the X-direction moving means 24. In the backward stroke, since the modified layer 66 has already been formed at the depth where the power density E of the pulsed laser beam LB is of the predetermined value, a modified layer 66 is formed stably, without rising, at the depth where the power density E of the pulsed laser beam LB is of the predetermined value, located short of the focused point FP of the pulsed laser beam LB, from the end 50b to the end 50a of the ingot 50. The separation layer forming process including the forward stroke and the backward stroke is performed a plurality of times while the chuck table 22 is indexing-fed, thereby forming the peel-off plane 70 in the ingot 50 at the position where the power density E of the pulsed laser beam LB is of the predetermined value, located short of the focused point FP of the pulsed laser beam LB. The peel-off plane generating step may be performed under the following processing conditions:

Wavelength of the pulsed laser beam LB: 1064 nm
  Repetitive frequency: 60 kHz
  Average output power: 1.5 W
  Diameter of the focused point FP: 3 μm
  Diameter of the spot: 5.3 μm
  Position of the focused point FP: 80 μm from the first surface
  Indexing distance Li: 250 through 400 μm
  Processing feed speed: 60 mm/second
  Overlapping ratio of adjacent spots: 80%

The spot referred to above is a spot at the position shallower than the focused point FP and in which the modified layer 66 is formed.

Figure 6:
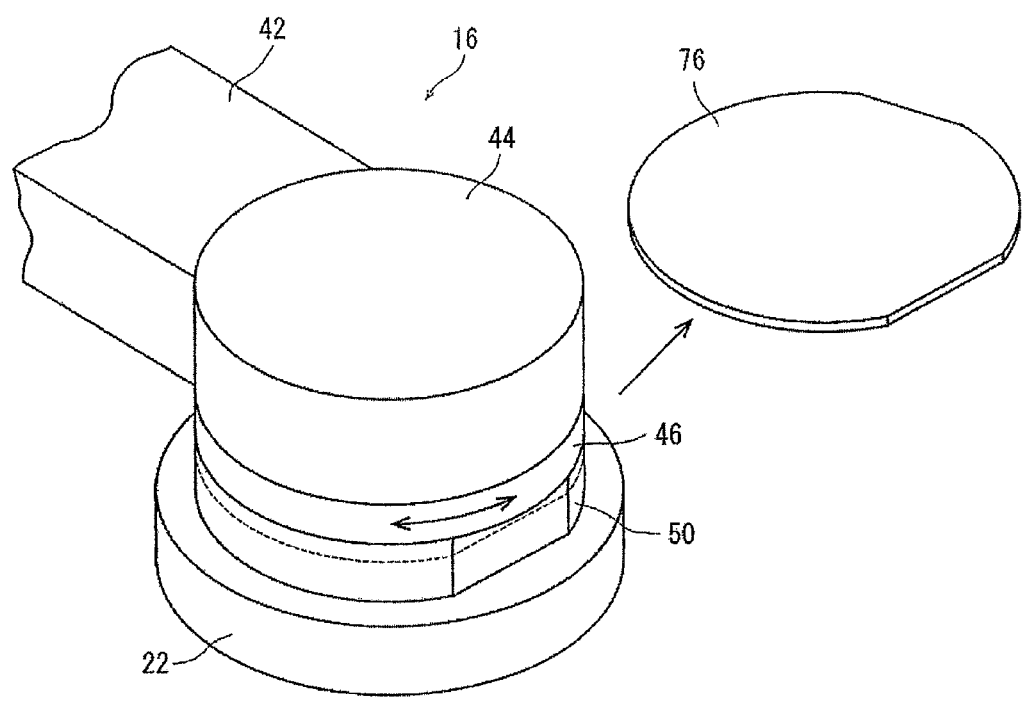
FIG. 6 is a perspective view illustrating the manner in which a wafer generating step is carried out on the single-crystal SiC ingot.

The peel-off plane forming step is followed by a wafer producing step in which a portion of the ingot 50 is peeled off from the peel-off plane 70 that serves as a boundary plane, producing an SiC wafer. In the wafer producing step, the moving means 8 moves the chuck table 22 to a position below the suction member 46 of the peeling means 16. Then, the vertically moving means lowers the arm 42 until the lower surface of the suction member 46 is brought into intimate contact with the first surface 52 of the ingot 50, as illustrated in FIG. 6. Then, the suction means is actuated to develop a vacuum in the suction holes in the suction member 46, thereby enabling the lower surface of the suction member 46 to attract the first surface 52 of the ingot 50 under suction. Thereafter, the ultrasonic vibration applying means is actuated to apply ultrasonic vibrations to the lower surface of the suction member 46, and the motor 44 is energized to rotate the suction member 46 about its own axis. At this time, since the layers 64 that are adjacent to each other in the direction A in which the off-angle α is formed are joined by the cracks 68 in the peel-off plane 70, a disk-shaped portion of the ingot 50 is peeled off from the peel-off plane 70 that serves as a boundary plane, as a wafer 76 having a desired thickness. Therefore, the wafer 76 is efficiently generated from the ingot 50 with a sufficient increase in productivity, and the amount of ingot material that is wasted is sufficiently reduced to approximately 30%. After the wafer 76 has been generated, the peel-off plane 70 of the ingot 50 is polished by polishing means, not illustrated, on the base table 4, and the peel-off plane generating step and the wafer generating step are performed in succession on the ingot 50, so that a plurality of wafers can be generated from the ingot 50.

With the method of producing an SiC wafer according to the present invention, in the peel-off plane forming step, the ingot 50 and the focused point FP are relatively moved in the forward stroke during which the focused point FP is relatively moved from the end 50a to the end 50b of the ingot 50 and in the backward stroke during which the focused point FP is relatively moved from the end 50b to the end 50a of the ingot 50, tracing back the separation layer 64 that has already been formed in the forward stroke. In the forward stroke, the modified layer 66 rises in the region 72 extending over the distance of approximately several tens of pm from the end 50a of the ingot 50 where the pulsed laser beam LB starts to be applied to the ingot 50. In the backward stroke, however, inasmuch as the modified layer 66 has already been formed at the depth where the power density E of the pulsed laser beam LB is of the predetermined value, a modified layer 66 is formed stably, without rising, from the end 50b to the end 50a at the position where the power density E of the pulsed laser beam LB is of the predetermined value, located short of the focused point FP of the pulsed laser beam LB. With the method of generating an SiC wafer according to the present invention, consequently, the region 72 where the modified layer 66 has risen does not present an obstacle to the peeling off of a portion of the ingot 50 from the peel-off plane 70 that serves as a boundary plane, so that a portion of the ingot 50 can easily be peeled off from the peel-off plane 70 that serves as a boundary plane.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A method of producing an SiC wafer from a single-crystal SiC ingot having a first surface, a second surface opposite the first surface, a c-axis extending from the first surface to the second surface and oblique to a line perpendicular to the first surface, and a c-plane perpendicular to the c-axis, the c-plane and the first surface jointly defining an off-angle therebetween, comprising:

a peel-off plane forming step of forming a peel-off plane in the SiC ingot by performing a separation layer forming step by positioning a focused point of a pulsed laser beam having a wavelength with which SiC is transmittable in the SiC ingot at a depth, from the first surface, corresponding to the thickness of a wafer to be produced from the SiC ingot, and applying a pulsed laser beam to the SiC ingot while the SiC ingot and the focused point are relatively processing-fed in a first direction perpendicular to a second direction in which the off-angle is formed, thereby forming a separation layer made up of a modified layer where SiC is separated into Si and C by a pulsed laser beam applied thereto and a pulsed laser beam applied next thereto is absorbed by the previously formed C, separating SiC into Si and C in a chain reaction, and cracks extending from the modified layer along the c-plane, the separation layer forming step being performed a plurality of times by indexing-feeding the SiC ingot and the focused point relatively to each other in the second direction in which the off-angle is formed, thereby forming a plurality of separation layers to form the peel-off plane; and a wafer producing step of peeling off a portion of the SiC ingot from the peel-off plane that serves as a boundary plane, as an SiC wafer;

wherein the peel-off plane forming step includes relatively moving the focused point from an end to an opposite end of the SiC ingot in a forward stroke and relatively moving the focused point from the opposite end to the end of the SiC ingot in a backward stroke to trace back the separation layer that has already been formed in the forward stroke.

* * * * *